United States Patent [19]
Whitehead et al.

[11] Patent Number: 5,079,920
[45] Date of Patent: Jan. 14, 1992

[54] HYDRAULIC SHAPE MEMORY MATERIAL STRESS TO HYDRAULIC PRESSURE TRANSDUCER

[76] Inventors: Charles A. Whitehead, 3508 S. Woodridge Rd., Birmingham, Ala. 35223; Kenneth N. Groom, 119 Hillcrest Loop, Enterprise, Ala. 36330

[21] Appl. No.: 563,056

[22] Filed: Aug. 6, 1990

Related U.S. Application Data

[63] Continuation-in-part of Ser. No. 448,250, Dec. 11, 1989, Pat. No. 4,945,727.

[51] Int. Cl.⁵ .................................. F03G 7/06
[52] U.S. Cl. ........................... 60/527; 60/528
[58] Field of Search .............. 60/527, 528, 529, 530, 60/531

[56] References Cited

U.S. PATENT DOCUMENTS

| | | | |
|---|---|---|---|
| 4,031,704 | 6/1977 | Moore et al. | 60/527 |
| 4,922,718 | 5/1990 | Hochstein et al. | 60/527 |
| 4,945,727 | 8/1990 | Whitehead et al. | 60/527 |
| 4,955,196 | 9/1990 | Lin et al. | 60/527 |

FOREIGN PATENT DOCUMENTS 48701  1/1987  Japan ............................. 60/527

*Primary Examiner*—Allen M. Ostrager
*Attorney, Agent, or Firm*—Hurt, Richardson, Garner, Todd & Cadenhead

[57] ABSTRACT

A hydraulic shape memory material force converter is provided comprising a shape memory material. The force converter utilizes hydraulic units and a hydraulic fluid. The hydraulic unit is changed from a first position to a second position when the shape memory material, connected at one end to one end of the hydraulic unit and its other to a fixed point or a second end of the hydraulic unit, changes from a martensitic to an austenitic state upon heating. The hydraulic fluid responds to the movement of the hydraulic unit by moving from the hydraulic unit to a receiving device, which receiving device performs work due to the motion of the hydraulic fluid. Upon cooling the shape memory material to change it from the austenitic state back to the martensitic state, the hydraulic unit returns to its original position, with a biasing means being provided to return the hydraulic unit to its rest position.

37 Claims, 5 Drawing Sheets

HYDRAULIC SHAPE MEMORY MATERIAL STRESS TO HYDRAULIC PRESSURE TRANSDUCER

This is a continuation-in-part of copending application Ser. No. 07/448,250 filed of Dec. 11, 1989 now U.S. Pat. No. 4,945,727.

BACKGROUND OF THE INVENTION

The present invention relates to utilizing a shape memory material in conjunction with hydraulic force conversion.

There are many varieties of shape memory materials including, for example, shape memory alloys (metals), shape memory polymers and shape memory proteins. Shape memory alloys have been known for years, while shape memory polymers and shape memory proteins are more recent developments. Research and development in the area of new or improved shape memory materials is an ongoing project in many different laboratories. Although different shape memory materials have different degrees of behavior and are actuated by differing environmental conditions, shape memory materials all have the unusual property of having a mechanical memory. If the shape memory material is given a first configuration and, if necessary, subjected to an appropriate treatment, and thereafter this configuration is deformed, the shape memory material will retain that deformed shape until the shape memory material is subjected to a predetermined environmental condition, such as, for example, an elevated temperature, an electrical current or a different pH environment, at which time it will return to its original configuration.

While returning to its original configuration, the shape memory material can perform work. In general, the change in environment (heat, electricity, pH, etc.) is all that is necessary to induce a high-stress recovery to the original predeformation configuration. In many cases, there is considerable mechanical stress output from the shape memory material while it is returning to its original predeformation configuration. Values of recovery stress in excess of 110,000 psi have been reported for certain shape memory alloys. Although each of the various different shape memory materials allow for mechanical shape recover, the shape memory alloys presently are the most widely used for high stress recovery.

Shape memory alloys have been known and available for many years and have been proposed as operative elements in various types of devices. Because of their dramatic strength and response to temperature, shape memory alloys have been proposed as alternatives to motors, solenoids, expandable wax actuators, and bimetallic temperature sensitive actuators. Although not a panacea, a shape memory alloy approach to electromechanical actuation may offer advantages which conventional approaches would find difficult or impossible. For example, large amounts of recoverable strain available from shape memory alloys offer work densities many times higher than conventional approaches. Also, the high electrical resistivity of shape memory alloys permits direct electrical actuation without extra parts and with efficient use of available energy.

Generally, the shape memory alloy is a nickel-titanium alloy called Nitinol or Tinel, although copper-based alloys have been used in many similar applications. Early investigations on Nitinol started in 1958 by the U.S. Naval Ordinance Laboratory which uncovered a new class of novel nickel-titanium alloys based on the ductile intermetallic compound TiNi. These alloys were subsequently given the name Nitinol which is disclosed in U.S. Pat. No. 3,174,851 of Mar. 23, 1965 entitled "Nickel-Based Alloys," U.S. Pat. No. 3,351,463 of Nov. 7, 1967 entitled "High Strength Nickel-Based Alloys" and U.S. Pat. No. 3,403,238 of Sept. 24, 1968 entitled "Conversion of Heat Energy to Mechanical Energy," all patents being assigned to the United States of America as represented by the Secretary of the Navy.

The great interest in the near stoichiometric TiNi composition alloys stems from their unusual mechanical memory. This thermal-mechanical shape memory, or shape memory effect, allows a shape memory alloy like Nitinol to return to a preset shape after mechanical distortion. If the shape memory alloy is given a first shape or configuration and subjected to an appropriate treatment, and thereafter its shape or configuration is deformed, it will retain that deformed shape or configuration until such time as it is subjected to a predetermined elevated temperature. When it is subjected to the predetermined elevated temperature, it tends to return to its original shape or configuration. Heating above the predetermined elevated temperature is the only energy input needed to induce high-stress recovery to the original predeformation shape. The predetermined elevated temperature is usually referred to as the transition or transformation temperature. The transition or transformation temperature may be a temperature range and is commonly known as the transition temperature range (TTR).

As is well known, a shape memory alloy has two states, separated only by temperature. When cooled, the shape memory alloy is in the martensitic state, in which the alloy is relatively soft and easily deformed. When warmed above the TTR, the shape memory alloy is transformed into the austenitic state in which the alloy is much stronger and stiffer than when in the martensitic state. When in the martensitic state, the alloy may be deformed or changed in configuration from a preset configuration while under relatively low load. When the alloy is heated through its TTR, the alloy remembers its original preset shape and tends to return to that shape. In the process, it builds up forces that oppose the deformation which occurred in the martensitic state, and the alloy can perform work while returning to its original shape.

Shape metal alloys have previously been used for actuator-type devices, often using elongated wire-shaped lengths of the alloy in tension (straight sections of wire) or in a combination of torsion, tension, and compression (helical coils of wire). The shape metal alloy wire is deformed while cool. When activation is required, the wire is heated to a temperature above the TTR, usually by passing an electric current through it. High electrical resistivity (similar to nichrome) of the shape metal alloy wire allows such an electrical current to impart thermal energy evenly along the length of the wire.

A metallurgical phenomenon which enables Nitinol alloys to have "shape memory" has been proposed, although the exact mechanism of energy exchange within the shape memory alloy is still in debate. The high temperature phase of the Nitinol is a body-centered-cubic crystal structure, usually referred to as an austenite. The low temperature phase of Nitinol is a twinned martensite which is represented by slightly shifting alternate rows of atoms away from the perpendicular registry of the higher temperature austenite phase. If the Nitinol in the twinned martensitic state is allowed to warm through its transition temperature range (TTR), it must return to the austenitic state. Since the state change is diffusionless, the transformation of Nitinol from the martensitic to the austenitic structure occurs very rapidly over a narrow temperature range. When a Nitinol specimen is cooled, it transforms from its austenitic state to a twinned martensitic state. While in this state, the specimen can be easily deformed by the application of a stress, which eliminates the martensitic twin. The applied stress shifts the alternating atomic registry of the twinned martensitic structure to a parallel registry. The deformation of the twinned martensitic specimen, resulting in the atoms slipping to a new parallel position, is a deformation which will be recovered upon heating. Unlike all other heat-exchange systems, Nitinol responds to temperature changes in an unbalanced way, in that the force needed to bend it when it is cold is much less than the force it releases when it returns.

The narrow transition temperature range (TTR) over which the shape memory alloy recovers its shape is primarily a function of the alloy's composition, which is typically about 53% to about 57% Ni balance Ti. A third, interstitial element, such as cobalt, may also be added to the alloy to control the TTR temperature. A direct atom-for-atom substitution of cobalt for nickel is usually performed to progressively lower the TTR. The TTR at which the "shape memory effect" (SME) occurs may be set anywhere from $-200°$ C. (Liquid Nitrogen) to $150°$ C. with great accuracy ($\pm 1°$ C.). For example, the TTR may be varied rather precisely as follows: a 1.0% change of the Ni/Ti ratio results in a $150°$ C. change in the TTR or 70 ppm NiTi per $1°$ C. It should also be noted that recoverable straining must be performed below the TTR of the shape memory alloy.

The shape memory effect covers three principal plastic deformation modes. These are (1) uniaxial tension, (2) torsion or twisting, and (3) bending (combined tension and compression). Compression, while a very useful mode, was not considered in the present invention because of the difficulty and complexity associated with its stressing and straining. However, the mode which utilizes the shape memory effect best volumetrically is the uniaxial tension mode, because the entire cross-section of the specimen is used for the shape memory effect. In fact, the highest recovery forces presently produced are induced under uniaxial tension with a 20-mil (0.020-inch) diameter wire.

Another unusual important property of Nitinol alloys is the amount of deformation or strain that can actually be recovered. If the motion or force is desired only once during the life of the alloy, large deformations or strains, such as 8% to 20%, can be utilized. If the desired motion or force requires repeated cycling during the lifetime of the alloy, it is important that the straining not exceed a critical level, or critical strain level (CSL), usually 6% to 8%, to insure recoverable plastic straining. Straining beyond this (CSL) limit will result in incomplete shape recovery of the shape memory alloy. Accompanying the shape recovery is a large energy conversion (heat to mechanical) which is capable of overtly exerting a large force or recovery stress. Values of recovery stress in excess of 110,000 psi have been reported for a 20-mil wire during uniaxial plastic straining of 6% to 8%. This recovery stress is proportional to the initial strain, and temperatures higher than the TTR are required to obtain maximum recovery stresses. The higher the initial strain, the greater the temperature difference between the TTR and maximum recovery stress temperatures. Also, as in the case of recovery stress, there is an optimum strain to obtain maximum work output. Values of maximum work output in excess of 2600 in-lbf/in$^3$ have been reported for a 20-mil wire during uniaxial plastic straining of 6% to 8%. Overall, the shape recovery produces high stress and work output.

Nitinol also has high electrical resistivity (approximately 76 microhm-cm), similar to nichrome; thus, it permits direct electrical shape memory actuation via resistance heating. Such heating results in an efficient work output as well as efficient use of energy input. Furthermore, the resistance will change slightly with temperature, depending on whether the temperature is rising or falling (heating or cooling). This change is dependent on specimen temperature and specimen memory state. Thus, the alloy will also lend itself to resistive feedback monitoring.

Some other interesting properties and characteristics of Nitinol should be mentioned. First, the cycle life of Nitinol has been reported as approaching infinite ($2.5 \times 10^7$ cycles) when strained below the recoverable strain limit (6% to 8%), limited only by the extent of testing performed to date. Second, Nitinol can develop a secondary shape memory. A "2-way" shape memory can be programmed into Nitinol specimens by appropriately repeating stress and/or thermal cycling. Once this conditioning has been achieved, a specimen will spontaneously revert to a shape when cooled, as well return to the initial memory state when heated. Finally, Nitinol is virtually non-magnetic, and practically inert to harsh corrosive environments, due to its elemental makeup. This allows Nitinol to be used in a wide variety of industrial and corrosive environments.

Previous research and development of the Nitinol has clearly indicated the potential for actuator-type devices. Such criteria as uniformly reliable strain-heat-recovery, accurate composition-related recovery range, high force and work output, electrical controllability of recovery, extremely high fatigue life, corrosion resistance, and non-magnetic nature are desirable criteria for prime movers in actuation devices.

Repeatability is normally required in actuator applications. In this respect, it is desirable that the Nitinol part return to its deformed shape upon cooling (after the heating which changes the deformed shape to the memory shape), so that it can revert to its memory shape again in successive cycles. Since the yield strength of Nitinol is low at temperatures below the TTR, reversibility can be effected by biasing the Nitinol element with a common spring. When Nitinol is heated, it exerts more than a sufficient force to overcome the spring completely and perform the desired shape memory operation. On the other hand, as soon as the Nitinol part cools through its TTR, the spring is now strong enough to force the Nitinol back into the deformed shape. In this way, the Nitinol is ready to operate on the next heating cycle.

As stated previously, reversibility can be "built into" shape memory materials and alloys, so that the use of the biasing spring or similar devices is not always necessary. Once this reversibility has appropriately been conditioned into the alloy, the specimen will spontaneously revert to a shape when cold, without external biasing means.

A more recent and less widely known shape memory material is the so-called polymer or elastomer shape memory material developed by Dr. Daniel W. Urry. Use of shape memory polymers has been disclosed in several patents and patent applications, such as U.S. patent application Ser. Nos. 184,873, filed on Apr. 27, 1988 and 184,407, filed on Apr. 21, 1988. These two applications disclose the use of shape memory polymers in the medical field and are incorporated herein for their discussions of shape memory polymers and elastomers. These shape memory polymers and elastomers have not been configured, optimized or otherwise used as the prime mover for force converters or actuators but, when employed according to the disclosure herein, are suitable shape memory materials for the present invention.

U.S. patent application Ser. No. 184,873 also discloses the use of a shape memory elastomer undergoing stretch/relaxation cycles to stimulate the growth of cells. This utilization of the shape memory elastomer in stretch/relaxation cycling can be compared to a crude pump if configured properly. As described herein, a sheet or strands of shape memory material, such as this shape memory elastomer, may be configured to achieve bladder compression in a force conversion apparatus.

In general, energy conversion from one form to another is an important concept when considering optimization of usable work output. Efficient machines for energy conversion input high energy potentials of one form and convert then into a usable output form. For example, energy conversions used in every day life include: hydraulic to electric (used in hydroelectric plants); electric to mechanical (used in electric motors); thermal to mechanical (used in fossil fuel and nuclear power plants); and hydraulic to mechanical (used in brakes, clutches and actuators). The hydraulic to mechanical conversion utilizes a high pressure input potential and yields an output of usable mechanical force movement. The amount of usable output is fully dependent on the type of machine used for the conversion and/or upon the types of energies being converted. The force converter described herein involves a mechanism which converts the high-stress and small-movement potential of shape memory materials into a usable force and movement output of either a mechanical or fluid form.

As described above, force conversion in general, for example from one type of force or energy to another type of force or energy or to change the direction a force, is an important concept in optimizing work output. Conversion, for example, from hydro to electrical, from electrical to mechanical, and from nuclear to electrical, are important conversions now used in every day life. Conversion from mechanical to hydraulic and back, such as in brakes, shock absorbers, dampers and the like, is another conversion with widespread applicability. Another type of conversion, high force and small movement to low force and large movement, also has widespread uses.

A well-known example of a hydraulic force converter is a typical automobile brake. A brake system converts mechanical foot power into a large hydraulic potential and then back to a usable mechanical force for braking. It converts a low force and large movement to a high force and small movement via hydraulic conversion.

The brake is one example of using one force to act upon a hydraulic fluid so as to urge the hydraulic fluid to produce work or output. Although shape memory materials have been used in certain types of force conversion, shape memory materials have not been used in connection with hydraulic force conversion, except as disclosed in this inventor's U.S. patent application Ser. No. 07/448,250, filed on Dec. 11, 1989. However, shape memory alloys have been used in certain types of non-hydraulic actuators.

The best-mode for the present invention uses the shape memory material Nitinol. It has been selected as the best-mode because it has the most desirable work and strain capabilities at the present time; however, other shape memory materials can be used.

Previous applications of shape memory alloys have included actuators in relays such as according to Jost (U.S. Pat. No. 3,968,380), Hickling (U.S. Pat. No. 3,849,756), and Clarke (U.S. Pat. No. 3,872,415); in temperature-sensing actuators as described by Melton (U.S. Pat. No. 4,205,293) and DuRocher (U.S. Pat. No. 3,707,694); in rotary actuators such as Block (U.S. Pat. No. 4,761,955); in electro-mechanical drive actuators such as Suzuki (U.S. Pat. No. 4,736,587); in valve actuators such as Wilson (U.S. Pat. No. 3,613,732); and the like. Many of these shape memory alloy actuators have used inefficient Nitinol springs and bent Nitinol wires as the prime mover of the actuating device and not the more efficient uniaxial Nitinol wires. The use of Nitinol springs in a shape memory alloy actuator does not allow for the maximum work/volume or work/weight ratio of an actuator device. Therefore, there is a need for an actuator that utilizes the more efficient uniaxial shape memory alloy wire as an actuating element based upon the force conversion apparatus disclosed herein.

A problem occurs, however, in the use of the more efficient uniaxial shape memory alloy wires in that the uniaxial tension of the wire is constrained to a maximum critical strain limit (CSL) of 6% to 8% strain elongation for optimal shape recovery. The attainable CSL elongation of the uniaxial shape memory alloy wire becomes a severe limitation to a shape memory alloy actuator design. Any application of an actuator requiring a larger movement and lower force is thereby severely limited with the use of uniaxial shape memory alloy wire. Therefore, there is a need for a shape memory alloy actuator utilizing a force conversion apparatus that is able to convert the high stress output and small movement of a uniaxial shape memory alloy wire actuating element to a lower force and larger movement actuator output based upon the force conversion apparatus disclosed herein.

Although many types of force conversion apparatus are known, a desirable shape memory alloy actuator would need to employ a force conversion apparatus that is simple, lightweight, compact and easily made. In addition, since many actuators are used in repeating-type functions, the force conversion apparatus must be capable of rapid response and rapid cycling. Therefore, there is also a need for a shape memory alloy actuator utilizing a force conversion apparatus that is simple, lightweight, compact, easily made, and capable of rapid response and cycling based upon the force conversion apparatus disclosed herein.

As a shape memory alloy actuator would often be used in industrial applications, the actuator should be capable of withstanding a harsh environment and be relatively easy to maintain. Therefore, there also exists a need for a shape memory alloy actuator that is rugged and requires little maintenance in operation based upon the force conversion apparatus disclosed herein.

In many applications, it is desirable to control the force output of a shape memory alloy actuator. An actuator having a precisely controllable force output adaptive to many applications would be desirable. Therefore, there exists still a further need for a shape memory alloy actuator whose actuating force output is controllable based upon the force conversion apparatus disclosed herein.

Further, many times a shape memory alloy actuator will be used in an environment where electrical current potential is readily available for providing energy for operating and controlling electro-mechanical devices. A shape memory alloy actuator capable of using electric current control for its operation would be desirable for use in such a commonly found environment. Therefore, there exists still a further need for a shape memory alloy actuator which is capable of being operated and controlled by an electric current based upon the force conversion apparatus disclosed herein.

Additionally, a shape memory alloy actuator based upon the force conversion apparatus disclosed herein can be constructed to utilize inexpensive and/or plentiful energy sources such as solar energy, waste energy and/or other thermal energies such as, for example, thermal potential fluids, waste thermal industrial fluids or solar heated fluids.

It is also desirable to have a work-producing device which provides useful work from low potentials. A force conversion apparatus based upon the disclosure herein satisfies his need.

The present invention is directed to providing a force conversion apparatus which contains a shape memory material utilized in conjunction with hydraulic force conversion. The force converter of the present invention uses a shape memory material to act upon a hydraulic force conversion unit thus acting upon the hydraulic fluid contained in the hydraulic force conversion unit and allowing the hydraulic fluid to perform work. In a basic embodiment, the force converter of the present invention uses a uniaxial shape memory material strand(s), such as a length of shape memory polymer or protein or strand(s) of shape memory alloy such as Nitinol wire, and a hydraulic cylinder containing a hydraulic piston. The best-mode for the present invention uses the shape memory material Nitinol. It has been selected as the best-mode because it has the most desirable work and strain capabilities at the present time, however, other shape memory materials can be used. The piston is moved from a first position to a second position by the action of the shape memory material, which is actuated by the application of an energy potential, such as, for example, heat or an electric current, applied to the shape memory material, thus forcing hydraulic fluid from the hydraulic cylinder. The movement of the hydraulic fluid can perform work, and the hydraulic unit can be connected to any of a number of devices such as, for example, valves, brakes, actuators, poppets, or any of the myriad of other devices capable of being operated by hydraulic force or an equivalent.

SUMMARY OF THE INVENTION

The basic hydraulic shape memory material force converter of the present invention comprises a hydraulic unit containing hydraulic fluid and a shape memory material (i.e. Nitinol) connected at one end of the hydraulic unit and its other end to a fixed point or a second end of the hydraulic unit. When the shape memory material is activated, it changes from its unactivated configuration to its activated configuration and causes the hydraulic unit to change from a first position to a second position. The hydraulic fluid contained within the hydraulic unit responds to the movement of the hydraulic unit from its first position to its second position by moving from the hydraulic unit to a receiving device, where the receiving device performs work due to the motion of the hydraulic fluid. Upon the cooling of the shape memory material, the shape memory material changes back from its activated to its unactivated state, thus allowing the hydraulic unit to return to its original position, thus allowing hydraulic fluid to return to the hydraulic unit. Optionally, the change in shape of the shape memory material may allow additional or new fluid to be drawn into the hydraulic unit through one-way valves or poppets as in the case of, for example, a motor circuit.

In a first embodiment of the hydraulic shape memory material force converter of the present invention, the hydraulic unit comprises a hydraulic cylinder, a hydraulic piston, hydraulic fluid dispersed within the hydraulic cylinder, and a length(s) of shape memory material as an actuating element. The hydraulic piston is moved from a first position within the hydraulic cylinder by the action of the shape memory material which is actuated by the application of an energy potential (i.e. electrical or pH and thermal fluids). Upon moving from the first position to a second position, the piston displaces the hydraulic fluid dispersed within the hydraulic cylinder. The hydraulic fluid is displaced from the hydraulic cylinder through a conduit to a receiving device in or upon which the hydraulic fluid may perform work. Removing the actuation energy potential (i.e. heat) from the shape memory material allows the piston to return to its first position, thus allowing the hydraulic fluid to return to the hydraulic cylinder, or additional or new fluid to be drawn into the hydraulic unit. If required, a biasing device may be attached to the piston to aid in returning the piston to its first position. In this embodiment the hydraulic shape memory material is located outside of the hydraulic piston.

In an alternate embodiment of the hydraulic shape memory material force converter of the present invention, the shape memory material length is located within the hydraulic cylinder and is immersed in the hydraulic fluid. The operation of the force converter is similar to the embodiment summarized above; however, the hydraulic fluid acts as a heat sink in removing heat from the shape memory material when it is unactivated, thus allowing the shape memory material to cool.

In another alternate embodiment of the hydraulic shape memory material force converter of the present invention, a nonrigid hydraulic unit is substituted for the hydraulic cylinder and hydraulic piston combination. In this embodiment, the hydraulic fluid is dispersed within the nonrigid hydraulic unit, which can be, for example, an expandable metal bellows or an elastomeric bladder, and the shape memory material acts upon this nonrigid hydraulic unit thus forcing the hydraulic fluid from the unit.

An additional alternate embodiment of the hydraulic shape memory material force converter of the present invention is a bladder compression unit comprising a nonrigid hydraulic fluid containment unit, such as an elastomeric bladder, contained within a sheet or layer or network of strands of shape memory material. The materials which are particularly useful for this embodiment are the shape memory polymers or elastomers. As the shape memory material contracts, it constricts the nonrigid hydraulic fluid containment unit forcing the hydraulic fluid from the containment unit through an outlet port. The movement of the fluid can be used to produce work.

The hydraulic force converter apparatus of the present invention is a simple, lightweight, compact, and easily made unit which is capable of rapid response and cycling. The force conversion apparatus may be configured to have a controllable force output. Such a controllable force output may be accomplished by, for example, the hydraulic ratios of the cylinders used, the selection of the type, size and number of the prime movers (shape memory materials), and the selection of the hydraulic and cooling fluids. As shape memory materials are capable of providing resistive feedback during heating and cooling precise heating and cooling of the lengths in feedback-dependent circuits easily is obtained.

As an example, one embodiment of the present invention is configured to provide a hydraulic shape memory alloy actuator which contains a shape memory alloy actuating element utilized in conjunction with hydraulic force conversion. The actuator of this embodiment uses a uniaxial shape memory alloy wire(s), such as a Nitinol wire(s), as an actuating element. The hydraulic shape memory alloy actuator has a pair of hydraulic cylinders, each containing a hydraulic piston. The first piston is moved from a first position by the action of the shape memory alloy actuating element which is actuated by passing an electric current through it which heats it. The second hydraulic piston responds through hydraulic fluid in communication with both cylinders to the movement of the first hydraulic piston to perform work, thereby allowing the high force output and small movement of the shape memory alloy actuating wire to be converted to a lower force and larger movement actuator output. Cooling of the actuator element allows the first piston to return to its first position, the second piston being biased to move back to its rest position.

In a first subembodiment of the hydraulic shape memory alloy embodiment of the present invention, the two cylinders are concentrically mounted; while in a second subembodiment, the second cylinder is external of the first cylinder but still in fluid communication with the first cylinder.

The hydraulic conversion apparatus utilized in the actuator subembodiment of the present invention is simple, lightweight, compact, and easily made. The conversion apparatus is also capable of rapid response and cycling. The apparatus, like the shape memory alloy actuator element itself, is rugged and requires little maintenance of operation. The actuator of the present invention may also be configured in a way such that its force output is controllable based on the number of shape memory alloy actuator elements contained in the actuator, the method utilized in selectively heating the elements, or the amount of electric current passed through the elements causing their heating. In addition, the shape memory alloy actuator elements are capable of providing resistive feedback during heating and cooling, thus allowing for precise heating and cooling of the elements in feedback-dependent temperature control circuits.

It is an object of the present invention to provide a force converter which utilizes a shape memory material in conjunction with a hydraulic force conversion unit.

It is also an object of the present invention to provide a force converter which is able to convert the high force output of a shape memory material to a hydraulic fluid.

A further object of the present invention is to provide a force converter which is simple, lightweight, compact, easily made, capable of rapid response and cycling, durable, economical and easily used.

It is an additional object of the present invention to provide a force converter which has a controllable output.

Another object of the present invention is to provide a force converter which can utilize the action of any shape memory material in any configuration and especially the more efficient uniaxial configuration.

It is yet another object of the present invention to provide a force converter which can replace currently used force converters.

It is also an object of the present invention to provide an actuator which utilizes the more efficient uniaxial shape memory alloy wire as an actuating element.

It is also an object of the present invention to provide an actuator which is able to convert the high force output and small movement of a uniaxial shape memory alloy wire actuating element to a lower force and larger movement actuator output.

It is a further object of the present invention to provide an actuator utilizing a force conversion apparatus that is simple, lightweight, compact, easily made and capable of rapid response and cycling.

It is another object of the present invention to provide an actuator which is rugged and requires little maintenance in its operation.

It is yet another object of the present invention to provide an actuator whose actuating force output is controllable.

It is still further an object of the present invention to provide an actuator which is capable of being operated and controlled by an electric current.

These objects and others are accomplished by the present invention, described in detail below, which is a hydraulic force converter utilizing a shape memory alloy.

DETAILED DESCRIPTION OF THE PREFERRED EMBODIMENTS

Figure 1:
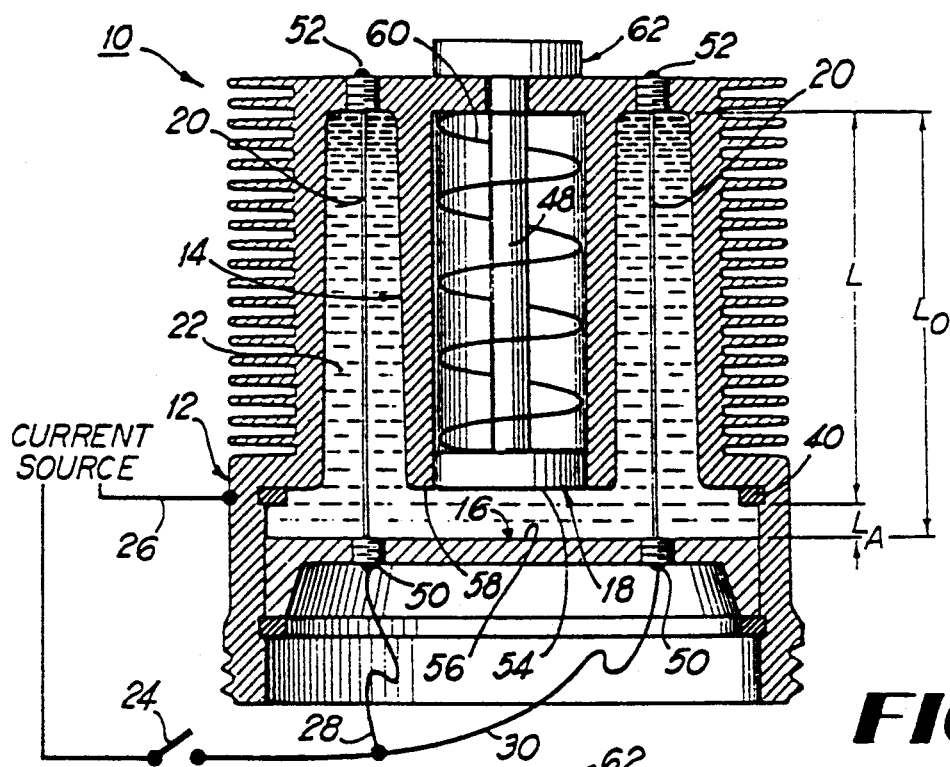
FIG. 1 is a cross-sectional view of a first subembodiment of the actuator of the present invention before actuation.
Figure 2:
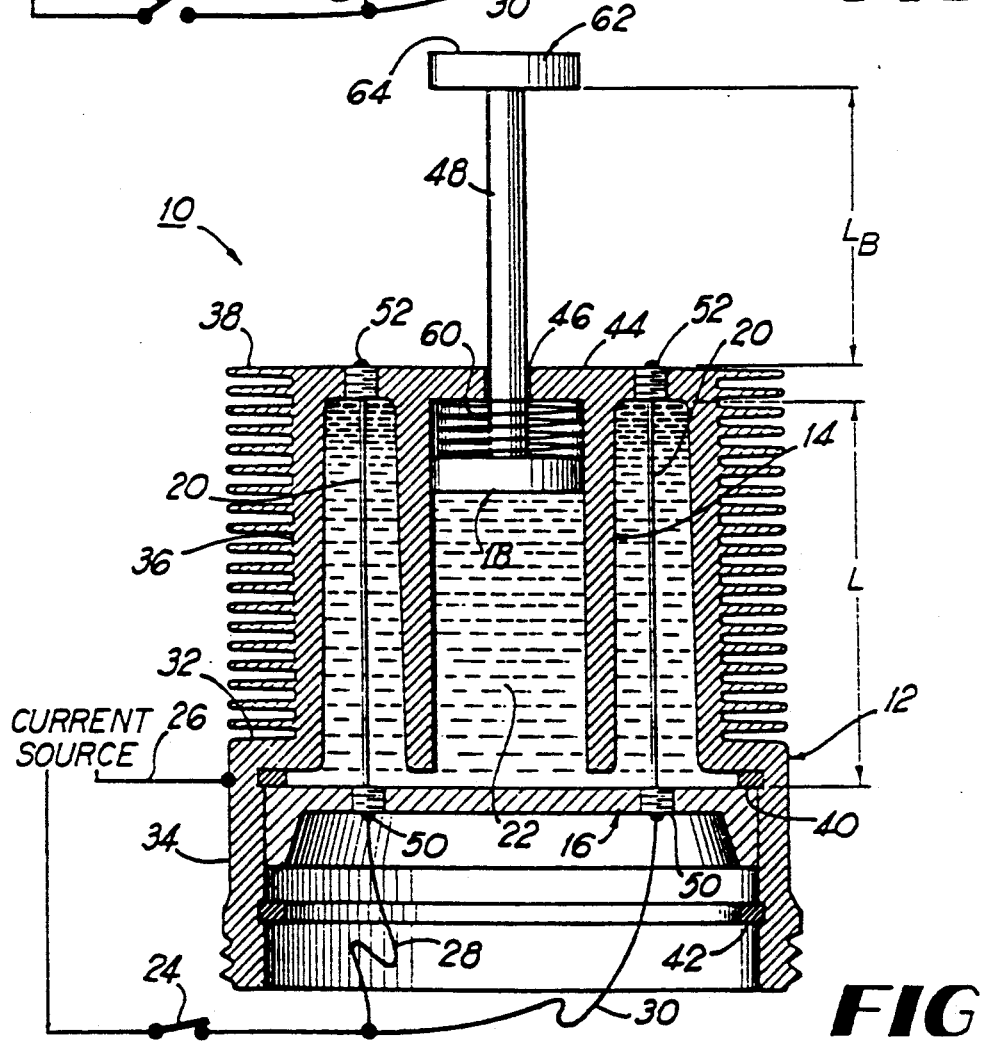
FIG. 2 is a cross-sectional view of the first subembodiment of the actuator shown in FIG. 1 when the actuator is an actuated state.
Figure 3:
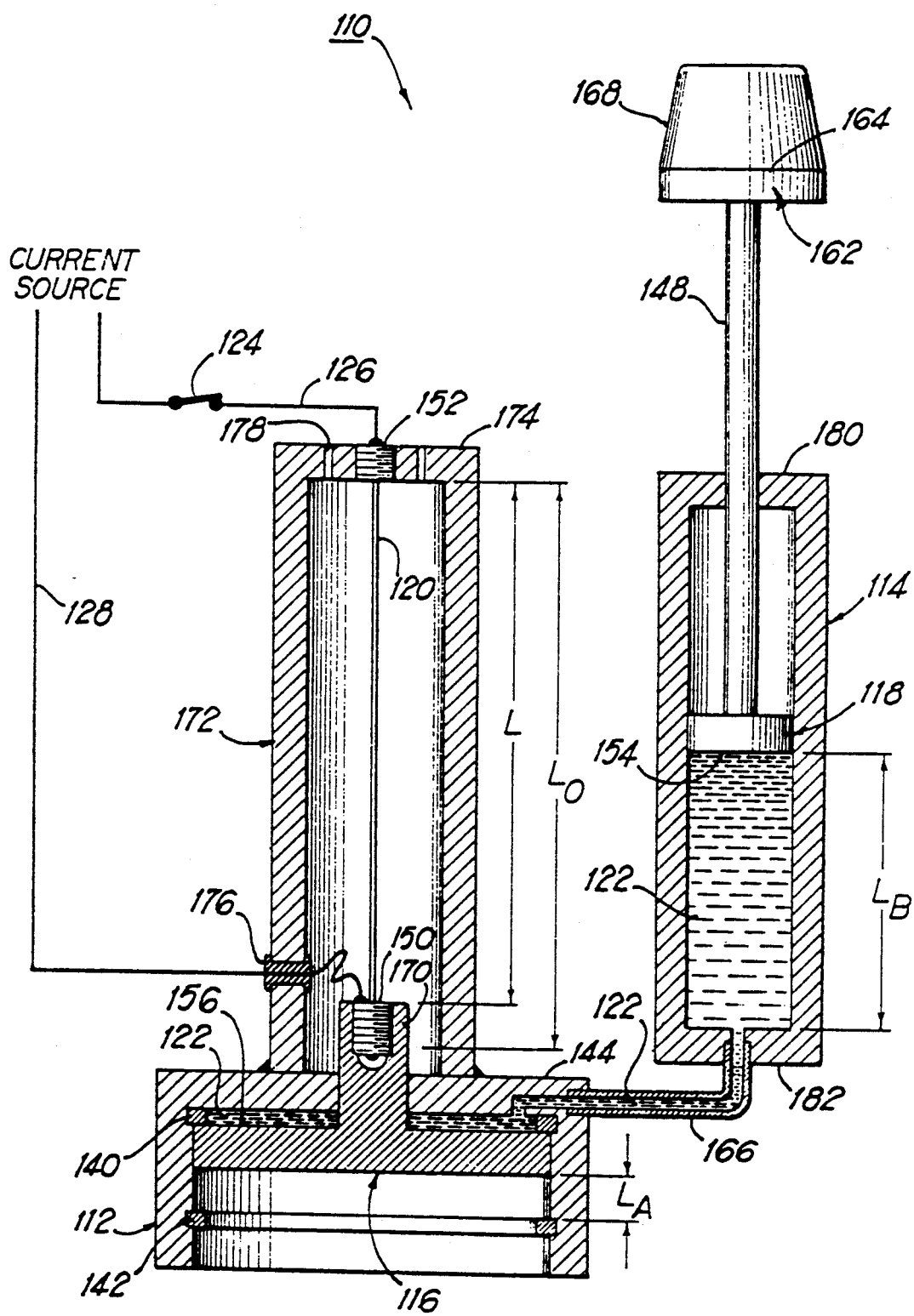
FIG. 3 is a cross-sectional view of an actuator embodiment according to a second subembodiment.
Figure 4:
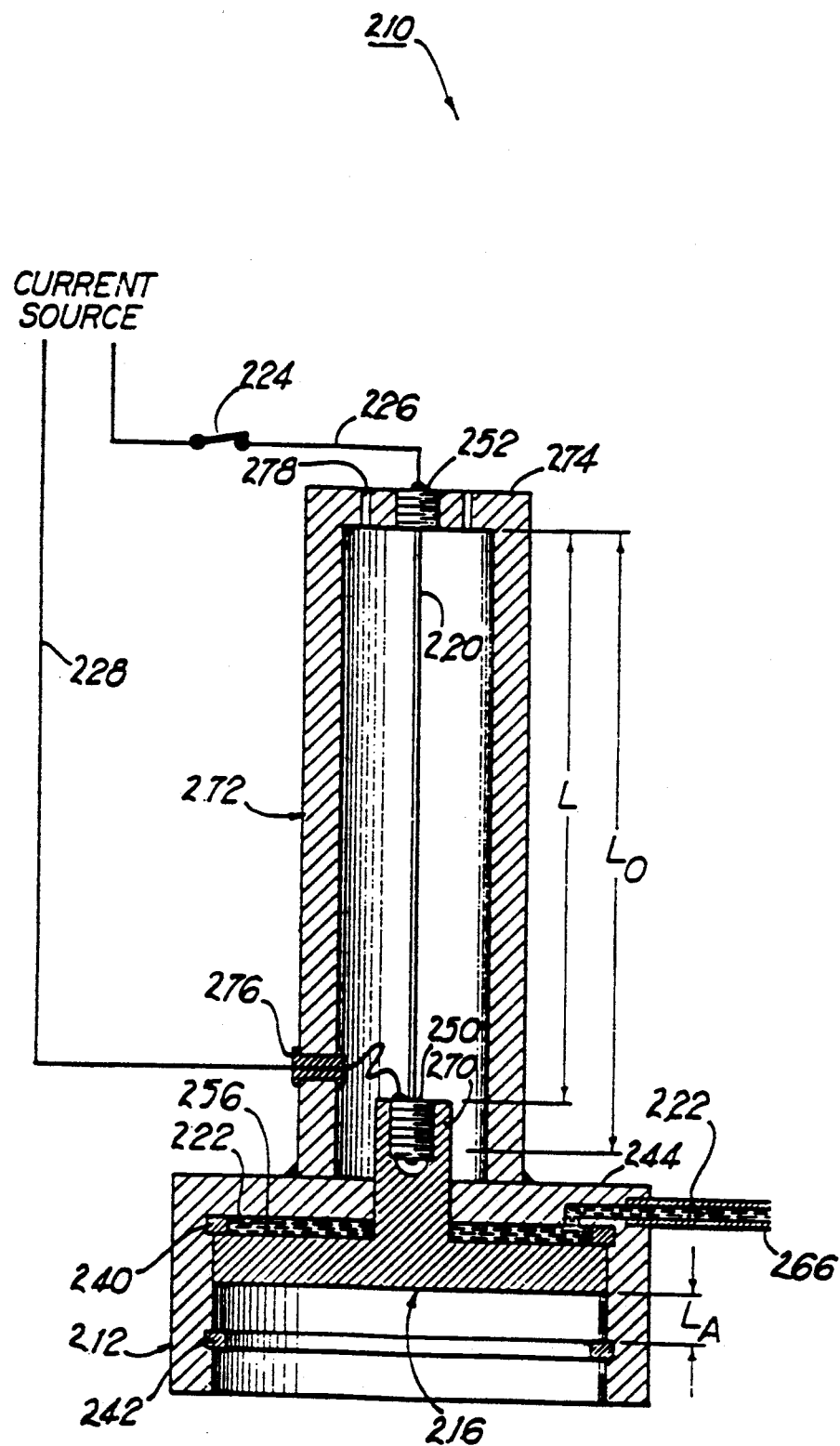
FIG. 4 is a cross-sectional view of a force converter of the present invention utilizing a hydraulic cylinder and piston shown in an activated state.
Figure 5:
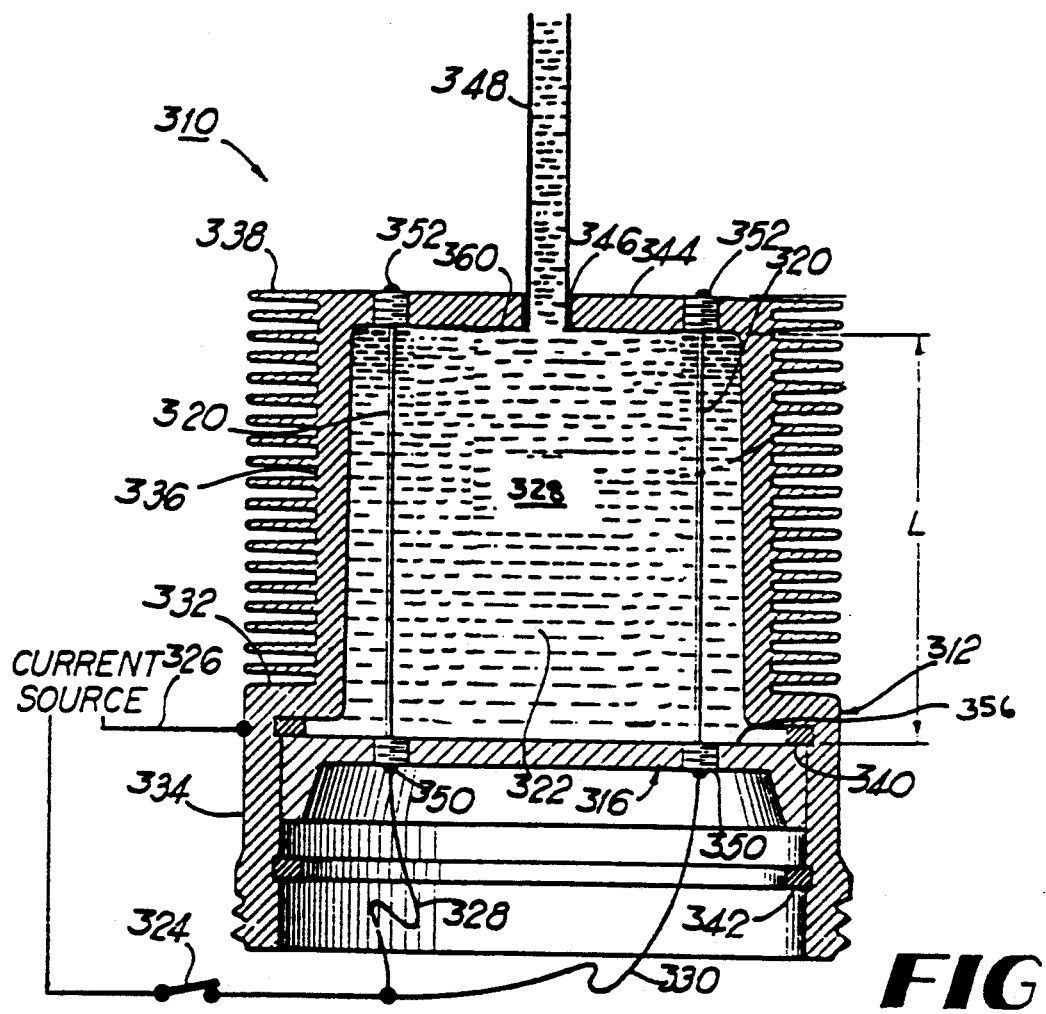
FIG. 5 is a cross-sectional view of an alternate embodiment of the present invention utilizing internal shape memory material strands shown in an unactivated state.
Figure 6:
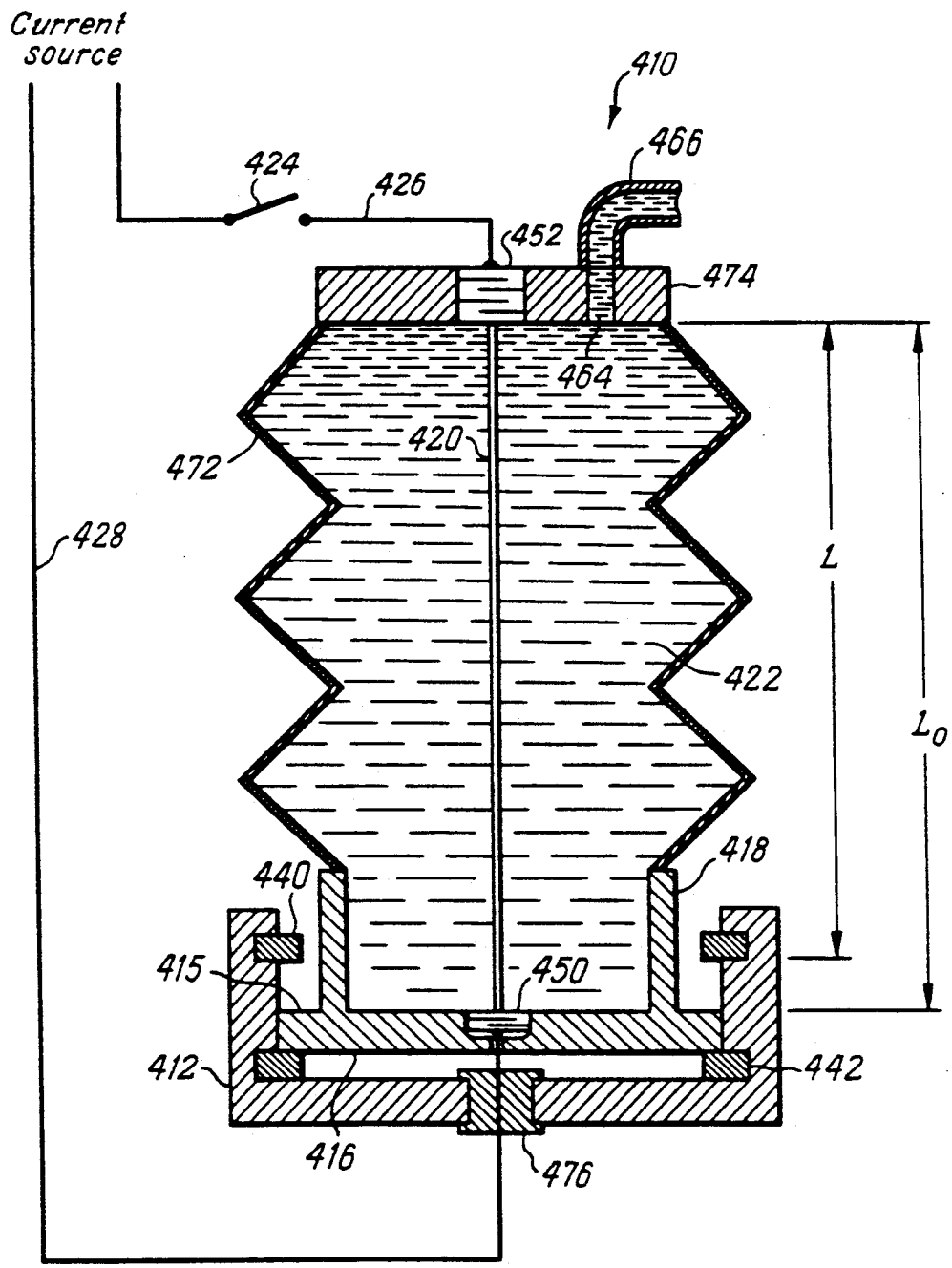
FIG. 6 is another alternate embodiment of the present invention utilizing an expandable bellows or bladder shown in a partially activated state.

Turning now to the drawings in which like numerals represent like components throughout the several views, FIGS. 1, 2, and 3 represent various subembodiments of the actuator embodiment of the present invention, and FIGS. 4, 5, and 6 represent various other embodiments of the force converter of the present invention.

Turning now to FIGS. 4, 5 and 6 which detail embodiments of the force converter of the present invention, FIG. 4 discloses one embodiment of the hydraulic force converter 210 of the present invention in the activated state, while FIG. 5 discloses an alternate embodiment of the hydraulic force converter 310 of the present invention in the activated state. FIG. 6 shows another alternate embodiment of the hydraulic force converter 410 of the present invention incorporating a more flexible hydraulic fluid unit.

Referring now to FIG. 4, the hydraulic force converter is illustrated utilizing a conventional hydraulic cylinder 212 and piston 216. Piston 216 is capable of movement within hydraulic cylinder 212 between first and second positions. A hydraulic fluid 222 is dispersed between the piston fluid contacting surface 256 and the cylinder top section 244. The movement of the piston 216 within the cylinder 212 forces the hydraulic fluid 222 from the space between the piston fluid contacting surface 256 and the cylinder top section 244 through conduit 266 to a receiver device (not shown) in or upon which the hydraulic fluid 222 may perform work. That is, the movement of the piston 216 within the cylinder 212 is communicated to a remote device by means of the hydraulic fluid 222 being forced through the conduit 266. The conduit 266 may comprise a hydraulic hose or similar means through which the hydraulic fluid 222 may pass for connecting the cylinder 212 and the receiving device (not shown).

In the configuration shown in FIG. 4, only one shape memory material strand 220 is shown, but a plurality of strands also may be utilized. Of course, when used herein, the term "strand" means any shape of shape memory material which can be connected between two points and includes, for example, uniaxial strands, braided strands, multifilament tows, coils or helixes, and links.

The hydraulic cylinder 212 has a top section 244 which has an opening therein through which a vertical extension 270 of the piston 216 passes. The extension 270 projects upwardly from the center of the first piston fluid contacting surface 256 and has a threaded fastener 250 located within it to provide a mechanical attachment point for strand 220. The fastener 250 also provides an electrical connection for the strand 220 when connected to electrical line 228. The threaded fastener 250 may be an electrically conductive or nonconductive material depending on the application. In general, when the piston 216 is made of an electrically conducting material, it is advantageous to have the fastener 250 be a nonconductive material, thereby allowing line 228 to contact strand 220 on fastener 250, but yet allow the strand 220 to be electrically insulated from the extension 270.

The hydraulic cylinder 212 has piston stops 240, 242 along its inside bore for limiting the up and down movement of the piston 216, respectively. Piston stop 240 is located at the inside angle at the juncture of the hydraulic cylinder 212 and the cylinder top section 244. The piston stops 240, 242 are preferably of the circlip type, having corresponding circlip grooves present in the inside bore of the hydraulic cylinder 212 to accommodate them. The piston stops 240, 242 should be made of a rigid material, such as steel, so as to limit accurately the movement of the piston 216.

Extending from the cylinder top section 244 is an elongated circular support 272 which, in this embodiment, is utilized in part to position the strand 220 outside the hydraulic cylinder 212 and, thus, out of contact with the hydraulic fluid 222 contained within the hydraulic cylinder 212. A threaded fastener 252 similar to threaded fastener 250 extends through the support top 274 and is in opposed relationship to the fastener 250 for providing an upper mechanical attachment point for the strand 220. The fastener 252 provides a fixed point for the attachment of the strand 220. Other points fixed in position relative to the hydraulic cylinder 212 also may be utilized.

It also should be noted that the strand(s) 220 may be fixed external to the cylinder 212, internal to the cylinder bore or piston bore, or to either of the surfaces of the piston 216 (that is, the surface contacting the hydraulic fluid 222 or the opposite surface) and still achieve the same results. As long as the strand(s) 220 can act upon the piston 216 causing the displacement of hydraulic fluid 222, the converter will fall within the scope of this invention. Further, strand(s) 220 may be fixed to both sides of the piston 216 forming a double-acting cylinder. When one set of strand(s) is activated, the piston will be pulled in one direction and when the other set of strand(s) is activated, the piston will be pulled in the opposite direction. In this mode, no biasing means such as return springs are necessary as activation of opposing strands in a complimentary manner will cause the return movement of the piston 216, allowing the hydraulic fluid 222 to be forced from and drawn back into the hydraulic cylinder 212. Alternatively, a shape memory material pump can be fashioned in this manner.

Similar to fastener 250, threaded fastener 252 also provides an electrical connection for the strand 220 when connected to the electrical line 226. Threaded fastener 252 also may be an electrically conductive or nonconductive material depending upon the application of the force converter 210. As described for fastener 250, it is advantageous for fastener 252 to be a nonconductive material when the support 272 is an electrically conductive material, thereby allowing line 226 to contact the top of strand 220 but still allowing the strand 220 to be electrically insulated from the support 272. The side wall of support 272 may have an electrical insulator 276 extending therethrough, the line 228 passing through insulator 276 thereby allowing line 228 to be electrically insulated from support 272. When the support 272 is an electrically nonconductive material, fastener 252 may be an electrically conducting material. The strands 220 are usually attached to the threaded fasteners 250, 252 by a brazing or welding process which does not degrade or detrimentally affect the strands 220, or by compression fittings, but may also be attached in any suitable manner.

In the embodiment shown in FIG. 4, the hydraulic cylinder 212 is made of a nonporous, rigid material capable of containing the hydraulic fluid 222, such as steel, cast iron, or a ceramic material. A nonporous, rigid, lightweight material, such as aluminum or plastic polymer, may be used for constructing a lightweight force converter 210. If a cylinder is used, the cylinder 212 is machined using machining methods well known in the art and requires no unusual finishing. The cylinder 212 also could be formed from a one-piece cast unit. Alternatively, as detailed below, the hydraulic unit may be nonrigid in construction. For example, a metal bellows, an elastomeric diaphragm, or an expandable bladder may be used to contain the hydraulic fluid, to substitute for the hydraulic cylinder 212, to substitute for the support 272, or to substitute for the piston 216. Therefore, it should be understood that while the best embodiments of this invention are described herein, a combination of a hydraulic unit, hydraulic fluid, and a shape memory material in which activation of the shape memory material causes the hydraulic unit to displace hydraulic fluid, thus allowing the hydraulic fluid to perform work is the invention.

In this regard, each of the hydraulic cylinder 212 and hydraulic piston 216 may be nonrigid in construction. For example, a nonrigid cylinder or piston may comprise a metal bellows, and elastomeric diaphragm, or an expandable bladder. Therefore, the terms "cylinder" and "piston" as used herein shall be understood to mean either a rigid or a nonrigid cylinder or piston. When nonrigid materials are used, piston stops 240, 242 may not be required provided that the movement of the cylinder 212 or piston 216 is limited to prevent strand 220 from overstraining.

The movement of a nonrigid cylinder 212 or piston 216 may be self-limited due to the nature of the construction of the cylinder 212 or piston 216 itself, or may require additional elements. Elements utilized to prevent strand 220 from overstraining due to excessive cylinder 212 or piston 216 movement include, but are not limited to, mechanical stops well known in the art, such as metal braces, brackets or spacers (not shown). A more detailed disclosure of such nonrigid materials utilized in connection with this invention is detailed in conjunction with FIG. 6. Alternatively, the force converter 210 may contain a means for preventing fluid pressure overload in the hydraulic cylinder 212 by use of a fluid accumulator (not shown). A typical fluid accumulator might comprise a spring loaded bellows arrangement which would be biased to overload pressures.

The cylinder 212 and piston 216 shown in FIG. 4 are a rigid cylinder and a rigid piston. The piston 216 has an upper fluid contacting surface 256 which is in contact with the hydraulic fluid 222 dispersed between the fluid contacting surface 256 and the cylinder top section 244. The piston 216 shown is made of a rigid material which is capable of withstanding the forces generated in the force converter 210. Materials that commonly are used as rigid piston materials include, but are not limited to, metals and polymers. When rigid pistons are used, "O-rings" or other piston rings may be utilized, as is well-known in the art, to prevent the hydraulic fluid 222 from escaping between the piston 216 and the cylinder 212 interior wall or between the piston extension 270 and the cylinder top section 244, as is well-known in the art.

The support 272 is made from any rigid material, such as metal or plastic, that will maintain the proper position of the strand 220 during operation of the force converter 210. The top 274 of support 272 has a plurality of channels 278 which allow for the escape of unwanted air or fluid trapped inside the chamber formed by the support 272 and the cylinder top section 244, and also to provide a way of venting warm air or fluid that has been heated by the strand 220. Generally, air circulates within the chamber formed by the support 272 and the cylinder top section 244 thus allowing for the cooling of strand 220. Alternatively, cooling of the strand 220 may be accomplished through convection transfer by moving a heat exchange medium, such as a cooling fluid, through the channels 278 and around the strand 220.

The shape memory material strand 220 generally is activated by heating the strand 220 above the shape memory material's transition temperature range. The embodiment shown in FIG. 4 contains an electrical apparatus for passing an electric current through the strand 220 so as to heat the strand 220 along its length above its transition temperature range. The electrical apparatus, as shown in FIG. 4, contains an electric current source and connecting lines 226, 228 (and 230 which is identical to 228 but is used in the case of multiple wires). Control of the electric current generated by the electric current source is provided by switch 224. Alternatively, the electrical apparatus may contain additional switches and connecting lines, which may be used to control individually the heating of a number of strands 220 if a plurality of strands is used. This type of configuration would allow the force converter 210 to have a controllable force output, as each strand 220 individually contributes a discrete force to the total output force of the force converter 210. In addition, a variable electric current source may be provided. The variable electric current source would allow the temperature, and therefore the force output of the strands to 220, to be variable. Of course, other electrical apparatus configurations are possible.

It should be noted that, although an electrical apparatus for passing an electric current through the strands 220 is shown, other means of selectively heating the strands 220 may be employed, such as convection, conduction, and radiant heating. For example, the strands 220 may be heated above the transition temperature range by an increase in the temperature of the air or heat exchange fluid present within the chamber formed by the support 272 and the cylinder top section 244. Furthermore, the hydraulic fluid 222 may be any fluid capable of use in a hydraulic environment, such as a liquid or a gas. Typically, a liquid such as standard commercial hydraulic fluid may be used, although other liquids may be employed. The fluid should be nonharmful to the surrounding cylinder and piston and, if the fluid will contact the strands 220, it should not be detrimental to the functioning of the strands 220. Preferably, a noncompressable fluid is used.

The force converter 210 operates upon the heating of the strand 220 above its transition temperature range. The heating of the strand 220 above its transition temperature range causes to shape memory material to return to its original configuration which, in this case, is a shorter length. Prior to heating of the strand 220, the piston 216 rests upon piston stop 242 and strand 220 is in its elongated configuration. Upon heating of the strand 220 above its transition temperature range, strand 220 returns to its original configuration, that being a shorter length, resulting in the rise of the piston 216 to its operative position as seen in FIG. 4, against piston stop 240. As piston 216 moves toward piston stop 240, the hydraulic fluid 222 is displaced through conduit 266 to the receiving device (not shown), whereupon the hydraulic fluid 222 may produce work. Cooling of the strand 220 below its transition temperature range allows the piston 216 to return to its unactivated position against piston stop 242.

The operation of the force converter 210 shown in FIG. 4 begins with the closing of the switch 224, thereby connecting the electric current source to the lines 226, 228. This completes the electric circuit for passing an electric current through the strand 220. Since strand 220 has a high electrical resistance, the passing of the electric current therethrough causes heating above its transition temperature range. As the strand 220 is heated above its transition temperature range, the longitudinal dimension thereof decreases, thereby pulling the piston 216 toward the threaded fastener 252 in the top 274 of the support 272. In this way, the piston 216 moves from its first or unheated position, against piston stop 242, to its second or heated position, against piston stop 240 as seen in FIG. 4. The movement of the piston 216 from its first position to its second position at piston stop 240 causes the hydraulic fluid 222 to be displaced through conduit 266 to the receiving device.

When switch 224 is returned to the open position, the electric current source is disconnected from connecting lines 226, 228, thereby interrupting the heating of the strand 220 which begins to cool, the cooling rate determined by the amount of heat dissipated by the air or heat exchange fluid contained within the chamber created by the support 272 and the cylinder top section 244. When the strand 220 cools below its transition temperature range the shape memory material changes back to its unactivated state at which time a biasing means (not shown but described in more detail below) has sufficient force to move the piston 216 to its unactivated position in hydraulic cylinder 212. The movement of the piston 216 from its operating position to its rest position allows hydraulic fluid 222 to move back into the space between the fluid contacting surface 256 and cylinder top section 244. The travel of the piston 216 is limited by the piston stops 240, 242 as previously described.

Turning now to FIG. 5, an alternate embodiment of the force converter is shown generally at 310. This embodiment of the force converter 310 which shows the force converter during activation, comprises a unitary hydraulic cylinder 312, a plurality of shape memory material strands 320, heat dissipation or cooling fins 38, and a top mounted hydraulic fluid conduit 348. The hydraulic cylinder 312 has a piston 316 capable of movement thereby between first and second positions.

A pair of lengths of shape memory material strands 320 is located within the hydraulic cylinder 312, each strand 320 in a diametrically opposed relationship to the other and attached at a first end to the piston 316 and at a second end to the top 344 of the hydraulic cylinder 312. In this manner, the second end of each strand 320 is connected to a fixed point disposed within the cylinder 312. The second end of each strand 320 alternatively may be attached to other points that are fixed in position relative to the cylinder 312. More than two strands 320 may be used in which case it is preferable to have the strands 320 evenly spaced from each other.

A hydraulic fluid 322 is dispersed within the interior of the hydraulic cylinder 312. The term "hydraulic" as used herein refers to the movement and force of a fluid, that fluid being any fluid capable of hydraulic operation, such as a liquid or a gas. An electric current source which is controlled by a switch 324 to provide electric current through the connecting lines 326, 328, 330 so as to electrically heat the strands 320 also is provided in this embodiment.

As shown in FIG. 5, the hydraulic cylinder 312 has an annular flange 332 connecting an upper cylinder section 336 with a lower cylinder 334. The upper cylinder section 336 may be of a reduced bore diameter than lower section 334. This design allows the incorporation of heat dissipation or cooling fins 338 while still maintaining an overall compact force converter design and allowing for a uniform cylinder wall thickness throughout. That is, the compact configuration of the force converter 310 shown in FIG. 5 allows for the attachment of cooling fins 338 (which may be radially disposed, as shown, or may be in a vertical position) on the outside of the upper cylinder section 336 that do not protrude beyond the exterior of the lower cylinder section 334. Alternatively, the hydraulic cylinder 312 may have a fixed bore diameter throughout its length and not have cooling fins 338, or cooling fins 338 may extend radially from the entire height (or any part of the height) of the hydraulic cylinder 312.

The cooling fins 338 may be located on the outside of the upper cylinder section 336 or on the inside surface of the hydraulic cylinder 312 (not shown) to promote dissipation of the heat from the strands 320. The cooling fins 338 provide a means for cooling the strands 320 and to shorten the time required for the strands 320 to change from their activated state back to their unactivated state. Other cooling means are possible, such as a thermoelectric heating exchange unit (such as, for example, a Peltier type) attached to the outside of the hydraulic cylinder 312 (not shown). Alternatively, cooling may be accomplished through convection transfer by moving a heat exchange medium, such as a cooling fluid, around the force converter 310 or the strands 320.

The hydraulic cylinder 312 of this embodiment also contains piston stops 340 and 342 along its inside bore for limiting the up and down movement of the piston 316, respectively. Piston stop 340 is located adjacent to and on the interior of flange 332. As in the first embodiment, the piston stops 340, 342 preferably are of the circlip type, having corresponding circlip grooves present in the inside bore of the hydraulic cylinder 312 to accommodate them. The piston stops 340, 342 should be made of a rigid material, such as steel, so as to limit accurately the movement of the piston 316 within the cylinder 312. The hydraulic cylinder 312 has a top 344 with a central opening 346 therethrough to allow passage of the hydraulic fluid 322 into the conduit 348. The movement of the piston 316 from its first, or rest, position resting on piston stop 342 to its second, or operating, position against piston stop 340 causes the hydraulic fluid 322 to be displaced from the interior of the hydraulic cylinder 312 out conduit 348 to a receiving device (not shown) where it may perform work.

Embedded within the hydraulic cylinder top 344 and in an opposed relationship to the piston 316 are a pair of threaded fasteners 352 which provide a secure mechanical connection for the attachment of the ends of each strand 320. In this embodiment, the threaded fasteners 352 shown typically are made of an electrically conducting material so as to provide an electrical connection between the wall of the hydraulic cylinder 312 and the strands 320. Since the threaded fasteners 352 maintain good electrical contact between the strands 320 and the hydraulic cylinder 312, the connecting line 326 is attached directly to the outer wall of the hydraulic cylinder 312 to provide an electric current path. The threaded fasteners 350 embedded in the piston 316 are connected to lines 328 and 330, respectively, and, in this embodiment, are made of an electrically conducting metal and are electrically insulated from each other by an electrically nonconducting piston 316. Alternatively, threaded fasteners 350 may be used that are capable of insulating the strands 320 from the surrounding piston 316 material when the piston 316 is made of an electrically conducting material. This will allow each strand 320 to be operated independently of one another depending on the operation desired.

The threaded fasteners 352 embedded within the cylinder top 344 alternatively may comprise the type of fastener in which the attached strand 320 is electrically insulated from he surrounding cylinder wall. For example, a nonconducting ceramic threaded fastener may be used. In that case, the connecting line 326 would be attached directly to the threaded fasteners 352 on the cylinder top section 344. The strands 320 usually are attached to the threaded fasteners 350, 352 by a brazing or welding process which does not degrade or detrimentally affect the strands 320, or by compression fittings, but may also be attached in any suitable manner.

Also as in the first embodiment, the hydraulic cylinder 312 shown in FIG. 5 is made of a nonporous, rigid material capable of containing the hydraulic fluid 322, such as steel, cast iron or a ceramic material. A nonporous, rigid, lightweight material such as aluminum or plastic polymer may be used for constructing a lightweight force converter 312. The cylinder 312 is machined using machining methods well-known in the art and requires no unusual finishing. The cylinder 312 also could be formed from a one-piece cast unit. Likewise, the piston 316 shown in FIG. 5 is a rigid piston which has an upper fluid contacting surface 356 which is in contact with the hydraulic fluid 322 dispersed within the hydraulic cylinder 312. The piston 316 shown in FIG. 5 is made of a rigid material which is capable of withstanding the forces generated in the force converter 310. Materials commonly used as rigid piston materials include, but are not limited to, metals and polymers. When rigid pistons are used, "O-rings" or other piston rings may be utilized to prevent the hydraulic fluid 322 from escaping between the piston 316 and the inner wall of the lower section 334 of the hydraulic cylinder 312, as is well-known in the art.

Alternatively, as disclosed below, the cylinder 312 and the piston 316 may be nonrigid in construction. When the cylinder 312 or piston 316 is comprised of a nonrigid material, piston stops 340, 342 may not be required, provided that the movement of the cylinder 312 or the piston 316 is limited to prevent strands 320 form overstraining. The movement of a nonrigid cylinder 312 or piston 316 may be self-limited due to the nature of the construction of the cylinder 312 or piston 316 themselves, or may require additional elements, such as, but not limited to, mechanical stops well-known in the art, such as metal brackets, braces or spacers, to prevent strands 320 from overstraining due to excessive cylinder 312 or piston 316 movement. Alternatively, the force converter 310 may contain a means for preventing fluid pressure overload in the hydraulic cylinder 312 by use of a fluid accumulator (not shown). A typical fluid accumulator might comprise a spring loaded bellows arrangement which would be biased to overload pressures.

The force converter 310 operates in a similar manner as the previously described force converter 210. Upon heating of the strands 320 above their transition temperature range and the resultant rise of the piston 316 to its operative position, the hydraulic fluid 322 in cylinder 312 is forced out through conduit 348 into a receiving device wherein the fluid 322 may perform work. Cooling of the strands 320 below their transition temperature range allows the reversal of the movement of the associated elements of force converter 310.

Referring now to FIG. 6, another alternate embodiment of the present invention is shown generally at 410. This embodiment comprises a nonrigid hydraulic unit 472, a shape memory material 420, and a movement limiting means comprising a base 416 with a flange 415 housed in a containment unit 412, and flange stops 440, 442. In this embodiment, flange containment unit 412 and unit top 474 are fixed relative to each other either by connection to rigid support units (not shown) or by being rigidly connected to each other, thus allowing hydraulic unit 472 to expand and contract relative to flange containment unit 412 and unit top 474 during operation. Force converter 410 is shown in an unactivated position in which case the flange 415 is in its rest position against flange stops 442. In its activated state, flange 415 would be pulled up to its activated position against flange stops 440.

The hydraulic unit 472 may be an expandable metal bellows, a flexible polymer, an elastomer, or any other nonrigid material appropriate to the environment in which the force converter 410 is to be used. At the lower end of hydraulic unit 472 is base 416 which further comprises extension wall 418 extending normal to the base 416. Base 416 is contained within flange containment unit 412 which limits the movement of the flange 415 between flange containment stops 440 and 442, thus preventing, among other things, overstraining of strand 420. One purpose of extension wall 418 is to prevent the hydraulic unit 472 from contacting the flange containment unit 412 or the flange stop 440 and wearing through or rupturing. Hydraulic unit 472 is integrally attached to unit top 474 and base 416. Unit top 474 comprises threaded fastener 452, conduit outlet port 464, and conduit 466.

A length of a shape memory material strand 420 is disposed between threaded fastener 452 and a second threaded fastener 450 located on base 416. Strand 420 is located within the interior of hydraulic unit 472 and generally is axially disposed. Threaded fasteners 450, 452 provide a secure mechanical connection point for the attachment of the ends of strand 420. As in the embodiments already discussed, threaded fasteners 450, 452 may be constructed of an electrically conducting material to provide an electrical connection between the strand 420 and the connecting lines 426 428 respectively, or the base 416 and the unit top 474, respectively. However, threaded fasteners 450, 452 need not be electrically conductive if an alternative means for supplying electric current or heat to strand 420 is provided. The strand 420 is usually attached to the threaded fasteners 450, 452 by a brazing or welding process which does not degrade or detrimentally affect the strand 420, or by compression fittings, but may also be attached in any suitable manner. A plurality of strands 420 and fasteners 450, 452 may be used.

The strand 420 is located within the hydraulic unit 472 and attached at a first end to the unit top 474 via threaded fasteners 452 and at a second end to the base 416 via threaded fastener 450. Therefore, strand 420 is immersed in and surrounded by a hydraulic fluid 422 dispersed within the interior of the hydraulic unit 472. As previously described, the term "hydraulic" as used herein refers to the movement and force of a fluid, that fluid being any fluid appropriate for use in hydraulic configurations, such as a liquid or gas.

The flange containment unit 412, base 416 and unit top 474 generally are made of nonporous, rigid materials such as steel, cast iron, or a ceramic material. A nonporous, rigid, lightweight material such as aluminum or plastic polymer may be used for constructing a lightweight force converter 410. The hydraulic unit 472 shown in FIG. 6 is nonrigid in construction and may comprise, for example, a metal bellows, an elastomeric diaphragm, or an expandable bladder. If further limitation of the movement of the hydraulic unit 472 is required due to its nonrigid construction, additional elements such as, for example, mechanical stops well-known in the art, such as metal brackets, braces or spacers, may be incorporated into the force converter 410. One purpose of such additional elements is to prevent unnecessary or unwanted movement of the hydraulic unit 472 and to prevent strand 420 overstraining due to hydraulic unit 472 movement.

The force converter 410 operates in a manner similar to the previously described force converters 210, 310. Upon heating of the strand 420 above its transition temperature range, the strand 420 changes to its activated configuration, which is a shorter length, pulling base 416 toward unit top 474, thus forcing hydraulic fluid 422 from the interior of the hydraulic unit 472 through outlet port 464 into conduit 466. The hydraulic fluid 422 is forced into a receiving device (not shown) where it may perform work. Cooling of the strand 420 below its transition temperature range allows the reversal of the movement of the associated elements of force converter 410. The embodiment shown in FIG. 6 also utilizes an electrical source for heating the strand 420. The electric current source which provides current through connecting lines 426, 428 so as to electrically heat the strand 420 is controlled by a switch 424.

In all three of the previously described embodiments of the force converter 210, 310, 410, a biasing means (not shown) may be utilized to aid in returning the piston 216, 316 or the base 416 to its unactivated position. The biasing means, may be, for example, a common metal spring, an additional load, the weight of the piston 216, 316 or base 416 itself, an elastomeric material, an additional length of shape memory material or a back pressured hydraulic fluid. Such a biasing means also aids in maintaining the piston 216, 316 or base 416 in the rest position when the strands 220, 320, 420 are not heated (the electric current source being disconnected from the strands 220, 320, 420 by switch 224, 324, 424) and the strands 220, 320, 420 are thus in the unactivated state. The biasing means is selected to have a force that is able to be overcome by the movement of the strands 220, 320, 420 in response to the change of the strands 220, 320, 420 to their activated state when heated (the electric current source is connected to the strands 220, 320, 420 through switch 224, 324, 424).

Therefore, the force converter 210, 310, 410 of the present invention allows the high force and small movement output of the strand(s) 220, 320, 420 in changing from the unactivated to the activated stage to be converted to a hydraulic force through hydraulic fluid 222, 322, 422. An efficient force converter 210, 310, 410 operation is thereby realized using a shape memory material in conjunction with hydraulic force conversion.

ACTUATOR EMBODIMENT

Another useful embodiment of the present invention is the hydraulic shape memory material actuator. In general, the actuator comprises two hydraulic cylinders which are in communication with each other through hydraulic fluid, in the form of a liquid, gas or other appropriate fluid, each hydraulic cylinder having a hydraulic piston. The shape memory material acts upon the first hydraulic piston, which displaces the hydraulic fluid from the first hydraulic cylinder into the second hydraulic cylinder where the hydraulic fluid displaces the second hydraulic piston, thus transferring the energy from the first hydraulic piston to the second hydraulic piston. When one of the hydraulic pistons has a small surface area and a long stroke and the other hydraulic piston has a large surface area and a short stroke, force conversion occurs.

Two subembodiments of the actuator embodiment of the present invention are described below. In each description, it should be noted that although a shape memory alloy is mentioned, any shape memory material can be used, and although hydraulic cylinders and pistons are mentioned, any hydraulic units such as, for example, expandable bellows and elastic bladders, can be used.

A. FIRST SUBEMBODIMENT

Turning now to FIGS. 1 and 2, the hydraulic shape memory material actuator of the first subembodiment of the actuator embodiment of the present invention is shown generally at 10, FIG. 1 disclosing the actuator 10 before actuation, while FIG. 2 illustrating the actuator 10 in an actuated or operative state. The actuator 10 comprises a first hydraulic cylinder 12 having mounted coaxially within it a second hydraulic cylinder 14. The first hydraulic cylinder 12 has a first piston 16 capable of movement therein between first and second positions, while the second hydraulic cylinder 14 has a second piston 18 movable between rest and operating positions. A pair of lengths of shape memory alloy wire 20 is located within the first hydraulic cylinder 12, each wire 20 in a diametrically opposed relationship to the other about the second cylinder 14 and attached at a first end to the first piston 16 and at a second end to the top 44 of the first hydraulic cylinder 12. In this manner, the second end of each wire 20 is connected to a fixed point disposed within the first cylinder 12. The second end of each wire 20 may alternatively be attached to other points that are fixed in position relative to the first cylinder 12. A fluid 22 is dispersed between the first piston 16 and the second piston 18, and can be found within the interior of the first hydraulic cylinder 12 and second hydraulic cylinder 14. The term "hydraulic" as used herein refers to the movement and force of a fluid, that fluid being either a liquid or gas. An electric current source is provided which is controlled by a switch 24 to provide current through connecting lines 26, 28, 30 so as to electrically heat the wires 20.

As shown in FIGS. 1 and 2, the first hydraulic cylinder 12 has an annular flange 32 connecting an upper cylinder section 36 with a lower cylinder section 34. The upper cylinder section 36 is of a reduced bore diameter than lower section 34. The two section cylinder design of the present invention maintains an overall compact actuator design and allows for a uniform cylinder wall thickness. For example, the compact configuration of the actuator 10 shown in FIGS. 1 and 2 allows for the attachment of spaced cooling fins 38 (which may be radially disposed, as shown, or may be in a vertical position) on the outside of the upper cylinder section 36 that do not protrude beyond the exterior of the lower cylinder section 34. Alternatively, the first hydraulic cylinder 12 may have a fixed bore diameter throughout its length.

The cooling fins 38 may be located on the outside of the upper cylinder section 36 or on the inside surface of first hydraulic cylinder 12 to promote dissipation of the heat from the wires 20. The cooling fins 38 provide a means for cooling the wires 20 and shorten the time required for the wires 20 to change from their austenitic state back to their martensitic state. Other cooling means are possible, such as a thermoelectric heating exchange unit attached to the outside of the first hydraulic cylinder 12. Alternately, cooling may be accomplished through convection transfer by moving a heat-exchange medium, such as a cooling fluid, around the actuator 10 or wires 20.

The first hydraulic cylinder 12 contains piston stops 40 and 42 along its inside bore for limiting the up and down movement of the first piston 16, respectively. Piston stop 40 is located adjacent flange 32. The piston stops 40,42 are preferably of the circlip type, having corresponding circlip grooves present in the inside bore of the first hydraulic cylinder 12 to accommodate them. The piston stops 40,42 must be made of a rigid material, such as steel, so as to accurately limit the movement of the first piston 16.

The first hydraulic cylinder 12 has a top 44 with a central opening 46 therethrough to allow passage of piston rod 48 which interconnects piston 18 with circular member 62. The opening 46 is of such dimensions so as to allow the passage of air around the rod 48 when it moves within the opening 46. If necessary, additional channels may be placed through the cylinder top 44 to allow for the escape of unwanted air in the second hydraulic cylinder 14 below.

Embedded within the first hydraulic cylinder top 44, and in an opposed relationship to the piston 16, are a pair of threaded fasteners 52 which provide a secure mechanical connection point for the attachment of the ends of each wires 20. The threaded fasteners 52 are typically made of an electrically conducting metal so as to provide an electrical connection between the wall of first hydraulic cylinder 12 and the wires 20. Since the threaded fasteners 52 maintain good electrical contact between the wires 20 and the first hydraulic cylinder 12, the connecting line 26 is attached directly to the outer wall of the first hydraulic cylinder 12 to provide an electric current path. The threaded fasteners 50 embedded in the piston 16 are connected to lines 28 and 30, respectively. The threaded fasteners 50 in the piston 16 are made of an electrically conducting metal and are electrically insulated from each other by the electrically non-conducting first piston 16. Alternatively, threaded fasteners 50 may be used that are capable of insulating the wires 20 from the surrounding piston material when the first piston 16 is made of an electrically conducting material. The threaded fasteners 52 embedded within the cylinder top 44 may alternatively comprise the type of fastener in which the attached wire 20 is electrically insulated from the surrounding cylinder wall. For example, a non-conducting ceramic threaded fastener may be used. In that case, the connecting line 26 would be directly attached to the threaded fasteners 52 of the cylinder top section 44. The wires 20 are usually attached to the threaded fasteners 50,52 by a brazing or welding process which does not degrade or detrimentally effect the wires 20, or by compression fittings, but may also be attached in any suitable manner.

The first hydraulic cylinder 12 and second hydraulic cylinder 14 are made of a non-porous, rigid material capable of containing the fluid 22, such as steel, cast iron, or a ceramic material. A non-porous, rigid and lightweight material such as aluminum or plastic polymer, may be used for constructing a lightweight actuator. The cylinders 12,14 are machined using machining methods well-known in the art and require no unusual finishing. The cylinders 12,14 could also be formed from a one-piece cast unit. The length of the second cylinder 14 is such that its bottom surface 58 terminates at the juncture of upper section 36 and lower section 34 to allow the fluid 22 to enter the cylinder 14.

As shown in FIGS. 1 and 2, the pistons 16,18 are rigid pistons. The first piston 16 has an upper fluid contacting surface 56 which is in contact with the fluid 22 dispersed between the first piston 16 and second piston 18. Likewise, the second piston 18 has, on its lower side, a fluid contacting surface 54 which is in contact with the fluid 22. The first piston 16 and second piston 18 shown are made of rigid materials that are capable of withstanding the forces generated in the actuator 10. Materials that are commonly used as rigid piston materials include, but are not limited to, metals and polymers. As shown, the first piston 16 is a rigid electrically nonconductive piston, preferably made from a plastic polymer. When rigid pistons are used, "O-rings" or other piston rings may be utilized, as is well-known in the art.

Alternatively, the first 16 and second 18 pistons may be nonrigid in construction. For example, a piston may comprise a metal bellows, an elastometric diaphragm, or an expandable bladder. Therefore, the term "piston" as used herein, shall be understood to mean either a rigid or nonrigid piston. When the first piston 16 is a piston, such as an elastometric diaphragm-type piston, the piston stops 40,42 may not be required, provided that the movement of the first piston 16 is limited to prevent wire 20 overstraining. The movement of a nonrigid first piston 16 may be self-limited due to the nature of the construction of the piston 16 itself, or may require additional elements. Elements utilized to prevent wire 20 overstraining due to excessive first piston 16 movement include, but are not limited to, mechanical stops well-known in the art, such as metal brackets or spacers.

The first piston 16 may also contain a means for preventing fluid pressure overload in the first hydraulic cylinder 12 by the use of a fluid accumulator (not shown) on the first piston 16. A typical fluid accumulator might comprise a spring-loaded bellows arrangement which would be biased to overload pressures.

The wire 20 is formed from a shape memory material of the types well-known in the art. These materials include polymers, proteins, nickel-titanium alloys, copper-based alloys, nickel-titanium-copper alloys, and other alloys exhibiting a thermal-mechanical shape memory. Although the shape memory effect process occurs in a number of principal plastic deformation modes, the mode which utilizes the shape memory effect best volumetrically is the uniaxial tension mode, because the entire cross-section of the alloy is used for the shape memory effect. In fact, the highest recovery forces presently produced are induced under uniaxial tension with a 20-mil (0.020-inch) diameter wire. For these reasons, the wire 20 of the present invention was chosen to be a 20-mil (0.020-inch) diameter wire of shape memory alloy. For the reasons stated above, Nitinol, a nickel-titanium alloy, was selected as the shape memory alloy for the wires 20 of the present invention, although other shape memory material configurations and materials having similar properties could certainly have been used. Further, although a linear section of Nitinol is preferably used for the wires 20, other Nitinol wire configurations can be used, such as a coil-shaped wire or braid.

The actuator embodiment 10 of the present invention is configured so as to permit a maximum straining of the wires 20 when the shape memory alloy is Nitinol. It was found that approximately 6% to 8% (CSL, critical strain limit) straining of the Nitinol wires 20 yielded the greatest recovery forces while still maintaining a fully recoverable strain. If full shape recovery after straining is not of concern, such as in the case of one-time utilization of the wires 20, larger deformations, such as 8% to 20%, may be utilized. If straining and full recovery of the shape memory alloy is desired, however, it is important that the straining not exceed the CSL. Straining beyond this CSL will result in incomplete shape recovery of the shape memory alloy.

Maximum straining of the wires 20 is accomplished by limiting the linear path of travel of the first piston 16 along the inside bore of the first hydraulic cylinder 12 by the use of piston stops 40,42 previously described. The piston stops 40,42 define the maximum amount of travel the first piston 16, and thereby the maximum length wire 20, can attain during the operation of the actuator 10. As shown in FIG. 1, the first piston 16 travel is limited to the linear path length $L_A$ which is set to be no greater than the CSL of the length L, the length of wire 20 when in the austenitic state. The length of travel $L_A$ of the first piston 16 due to the change in state of the length of wire 20 is always less than the length of travel of the second piston 18 and, therefore, less than the linear path length $L_B$ of the output stroke of the actuator 10. In addition, the force imparted by the movement of the first piston 16 due to the change in state of the length of wire 20 is always greater than the actuator output force found at the second piston 18 or circular member 62.

The actuator embodiment of the present invention contains an electrical apparatus for passing an electric current through each of the alloy wires 20 so as to selectively heat the wires 20 along their lengths above the shape memory alloy transition temperature range (TTR). The electrical apparatus, as shown in FIGS. 1 and 2, contains an electric current source and connecting lines 26, 28, 30. Control of the electric current generated by the electric current source is provided by switch 24. In an alternate configuration, the electrical apparatus may contain extra switches and connecting lines, which may be used to individually control the heating of a number of alloy wires 20. This type of configuration would allow the actuator embodiment 10 of the present invention to have a controllable actuating force output, as each wire 20 individually contributes a discrete force to the total actuator output force of the actuator 10. In addition, a variable electric current source may be provided (not shown). The variable electric current source would allow the temperature, and therefore the force output of the wires 20, to be variable. Other electrical apparatus configurations are possible.

It should be noted that, although an electrical apparatus for passing an electric current through the wires 20 is shown, other means of selectively heating the wires 20 may be employed, such as convection, conduction, and radiant heating. For example, the wires 20 may be heated above the TTR by an increase in the temperature of the fluid 22 contained within the actuator 10.

The fluid 22 in the first hydraulic cylinder 12 may be either a liquid or a gas. Typically, a liquid such as standard commercial hydraulic fluid may be used, although other liquids may be employed. The liquid should be non-harmful to the surrounding cylinders and pistons and should not be detrimental to the functioning of the wires 20. Preferably, a noncompressible fluid is used.

A biasing means is utilized in the actuator 10 of the present invention and is disposed within the second hydraulic cylinder 14. In FIG. 1 and FIG. 2, the biasing means is shown as a common metal spring 60 about piston rod 48. As shown in FIG. 1, the spring 60 maintains the second piston 18 in a rest position when the wires 20 are not heated (the electric current source is disconnected from the wires 20 by switch 24) and the wires 20 are thus in the martensitic state. The spring 60 is selected to have a force that is able to be overcome by the movement of the second piston 18 in response to the change of the wires 20 to the austenitic state when heated (when the electric current source is connected to the wires 20 through switch 24). Other biasing means are possible using other materials or configurations. For example, the spring 60 may be eliminated from the actuator 10 when a load is placed on the load bearing surface 64 of circular member 62 that is able to exert a force on the second piston 18 sufficient enough to provide a biasing means.

The operation of the actuator 10 found in FIGS. 1 and 2 begins with the closing of the switch 24, thereby connecting the electric current source to the lines 28 30. This completes the electric circuit for passing an electric current through the wires 20. Since wires 20 have a high electrical resistance, the passing of the electric current therethrough causes heating above their TTR. As the wires 20 are heated above their TTR, the longitudinal dimension thereof decreases, thereby pulling the first piston 16 towards the threaded fasteners 52 in the top 44 of the first hydraulic cylinder 12. In this way, the first piston 16 moves from its first or unheated position, as seen in FIG. 1, to its second or heated position, as seen in FIG. 2.

The movement of the first piston 16 from its first position to its second position at piston stop 40 causes the fluid 22 to displace the second piston 18 from its rest position, as seen in FIG. 1, to its operating position, as seen in FIG. 2, within the second hydraulic cylinder 14. The circular member 62 and rod 48 are thereby extended in the actuated position when the second piston 18 is so moved into its full, operating position. The heat generated by the heating of the wires 20 by the electric current is dissipated into the fluid 22 and then into the surrounding first hydraulic cylinder 12. The cooling fins 38 help to dissipate this heat to the surrounding environment.

When switch 24 is then returned to the open position, the electric current source is disconnected from connecting lines 28,30, thereby interrupting the heating of the wires 20 which begin to cool, the cooling rate determined by the amount of heat dissipation by the fluid 22 and first hydraulic cylinder 12. When the wires 20 cool below their TTR, the shape memory alloy changes back to its martensitic state at which time the spring 60 has sufficient force to move the second piston 18 within the second hydraulic cylinder 14. The spring 60 returns the second piston 18 to its rest position. The movement of the second piston 18 from its operating position to its rest position displaces the fluid 22 back into the first hydraulic cylinder 12 and thereby moves the first piston 16 back to its first position. The travel of the first piston 16 is limited by the piston stops 40,42 as previously described.

Therefore, the actuator 10 of the present invention allows the high force and small movement output of the wires 20 in changing from the martensitic to the austenitic state to be converted to a lower force but larger movement output of the second piston 18. An efficient actuator 10 operation is thereby realized utilizing a shape memory alloy in conjunction with hydraulic force conversion.

A number of design parameters are considered in constructing the actuator embodiment 10 of the present invention. The second hydraulic cylinder 14 and second piston 18, being hydraulically connected to respond to the movement of the first piston 16, are preferably of smaller diameters than cylinder 12 and piston 16. The first cylinder 12 is a hydraulic cylinder with a high force-to-stroke ratio, while the second cylinder 14, being the response cylinder, is a smaller hydraulic cylinder with a smaller force-to-stroke ratio.

The bore sizes of the hydraulic cylinders could have been any one of a number of combinations, but, since compactness of actuator size was one of the desirable goals, it was determined to correlate the hydraulic cylinder diameters with the length of wires 20 and their associated contraction. Assuming that the pressure P is the uniform system hydraulic pressure, that fluid 22 is an incompressible hydraulic fluid, and that the maximum shape memory alloy elongation is the CSL, the following equations can be derived:

The force $F_B$ exerted on the second piston 18 when the first piston 16 is moved by the change of state of Nitinol is given by:

$$F_B = PA_B \text{ or } P = F_B/A_B \quad (1)$$

Where
$A_B$ = the surface area of the second piston fluid contacting surface 54.

The force $F_A$ exerted on the first piston 16, due to the change of state of Nitinol is given by:

$$F_A = PA_A \quad (2)$$

Where
$A_A$ = the surface area of the first piston fluid contacting surface 56.

Now combining equations (1) and (2) to get:

$$F_A = F_B/A_B(A_A) \text{ or } F_A/F_B = A_A/A_B \quad (3)$$

Assuming that the fluid volume $V_A$, of the first hydraulic cylinder 12 is the same as the fluid volume $V_B$ of the second hydraulic cylinder 14, we have:

$$V_A = V_B$$

$$L_A A_A = L_B A_B \text{ or } L_B/L_A = A_A/A_B \quad (4)$$

Where
$L_A = L_o - L$ and
L = the length of the wires 20 in the austenitic state.
$L_o$ = the length of the wires 20 in the martensitic state.

Assuming that the maximum elongation of the wires 20 is 8%, we have:

$$L_A = (0.08)L \quad (5)$$

To keep the actuator 10 as compact as possible, the height $L_B$ of the output stroke of the second piston 18 (or attached circular member 62) is made to be near that of the wires 20.

Therefore, $$L_B = L \quad (6)$$

Now combining equations (4), (5) and (6), we derive:

$$(0.08)LA_A = LA_B$$

or $$A_A/A_B = 12.5 \quad (7)$$

Combining equations (7) and (3), we have:

$$F_A/F_B = 12.5 \quad (8)$$

Therefore, the force and stroke ratios have been calculated as:

$$L_B/L_A = A_A/A_B = F_A/F_B = 12.5$$

Assuming that the surface areas $A_A$ and $A_B$ can be represented by:

$$A_A = \pi/4 \, (D_A)^2$$

$$A_B = \pi/4 \, (D_B)^2$$

Where
$D_A$ = the diameter of the first hydraulic cylinder 12 bore.
$D_B$ = the diameter of the second hydraulic cylinder 14 bore.

The cylinder bore ratio can be derived as follows:

$$D_A/D_B = 3.54$$

Both the calculated cylinder fluid contacting surface area ratio ($A_A/A_B = 12.5$) and the cylinder bore ratio ($D_A/D_B = 3.54$) were utilized in constructing the actuator 10 of the present invention. Although many other combinations are possible, these ratios were chosen to design for the maximum compactness with a suitable force output of the actuator 10.

B. SECOND SUBEMBODIMENT

FIG. 3 shows the second subembodiment 110 of the actuator embodiment 10 of the present invention in the actuated state with switch 124 closed. In this configuration the second hydraulic cylinder 114 and second piston 118 are physically separated from the first hydraulic cylinder 112 and first piston 116. This alternate configuration may be useful where a remote location for the second hydraulic cylinder 114 is desired. The movement of the pistons 116,118 within the cylinders 112,114 is communicated by means of a conduit 166 containing fluid 122. The fluid 122 is disposed between the first piston fluid contacting surface 156 and the second piston fluid contacting surface 154. The conduit 166 may comprise a hydraulic hose or similar means for connecting the fluid between the two cylinders 112,114. In this configuration, only one shape memory alloy wire 120 is shown, but a plurality of wires may also be utilized. FIG. 3 shows a load 168, comprising a weight, placed on the load bearing surface 164 of circular member 162 so as to provide a sufficient biasing means for the second piston 118. The load 168 is selected so as to return the second piston 118 to a rest position from an operating position when the wire 120 changes from its austenitic state back to its martensitic state. Other biasing means are possible, such as using a common metal spring to return the second piston to its rest position. The circular member 162 is connected to the second piston 118 by means of a piston rod 148.

As shown in FIG. 3, the first hydraulic cylinder 112 of the second embodiment has a top section 144 which has an opening therein through which a vertical extension 170 of the piston 116 passes. The extension 170 projects upwardly from the center of the first piston fluid contacting surface 156 and has a threaded fastener 150 located within it to provide a mechanical attachment point for the wire 120. The fastener 150 also provides an electrical connection for the wire 120 when connected to electrical line 128. As in the case of the threaded fasteners 50,52 shown in FIGS. 1 and 2, the threaded fastener 150 may be an electrically conductive or non-conductive material depending on the application. In FIG. 3, the fastener 150 is shown as a nonconductive material when the first piston 116 is made of an electrically conducting material, thereby allowing line 128 to contact the wire 120, but yet allowing the wire 120 to be electrically insulated from the extension 170.

The first hydraulic cylinder 112 has piston stops 140,142 similar in function to the piston stops 40,42 shown in FIGS. 1 and 2 to limit the travel of the first piston 116 in the bore of the first hydraulic cylinder 112. Extending from the first cylinder top 144 is an elongated circular support 172 which is utilized to position the wire 120 outside the first hydraulic cylinder 112 and thus, out of contact with the fluid 122 contained within the first hydraulic cylinder 112. A threaded fastener 152 extends through the support top 174 and is in opposed relationship to the fastener 150 for providing an upper mechanical attachment point for the wire 120. The fastener 152 provides a fixed point for the attachment of the wire 120. Other points fixed in position relative to the first cylinder 112 may also be utilized.

The threaded fastener 152 also provides an electrical connection for the wire 120 when connected to the electrical line 126. As in the preferred embodiment of FIGS. 1 and 2, the threaded fastener 152 may be an electrically conductive or nonconductive material depending on the application. In FIG. 3, the fastener 152 is shown as a non-conductive material when the support 172 is an electrically conductive material, thereby allowing line 126 to contact the top of wire 120 but still allowing the wire 120 to be electrically insulated from the support 172. The side wall of support 172 has an electrical insulator 176 extending therethrough, the line 128 passing through insulator 176. When the support 172 is an electrically non-conductive material, fastener 152 may be electrically conducting material.

The support 172 is made from any rigid material, such as metal or plastic, that will maintain the proper position of the wire 120 during operation of actuator 110. The top 174 of support 172, has a plurality of air channels 178 which allow for the escape of unwanted air trapped inside the chamber formed by the support 172 and the first cylinder top section 144 and also provide a way of venting warm air that has been heated by the wire 120. Alternately, cooling of the wire 120 may be accomplished through convection transfer by moving a heat-exchange medium, such as a cooling fluid, through the channels 178 and around the wire 120.

The second hydraulic cylinder 114 has a top 180 and a bottom 182 with top 180 having an opening through which the piston rod 148 passes. The dimensions of the opening are such that air may pass around the rod 148 when it moves through the opening. Alternatively, air channels may be placed in the top 180 to allow for the escape of unwanted air from inside the second hydraulic cylinder 114. The conduit 166 interconnects the interior of second cylinder 114 through its bottom 182 with the interior of the first cylinder 112 above piston 116. A load 168 is shown resting on the load bearing surface 164 of circular member 162. The load 168 will also act as a biasing means for the second piston 118, as previously described.

The actuator 110 operates in a similar manner as the previously described actuator 10. Upon heating of the wire 120 above its TTR and the resultant rise of the piston 116 to its operative position as seen in FIG. 3, the fluid 122 in cylinder 112 is forced out through conduit 166 into cylinder 114, whereupon the fluid 122 therein acts upon piston surface 154 to force piston 118 upwardly, causing the load 168 to rise. Cooling of the wire 120 below its TTR reverses the movement of the associated elements of actuator 110.

It now becomes apparent that the above-mentioned force converter is capable of achieving the above-stated objects and advantages. It is obvious that those skilled in the art may make modifications to the apparatus without departing from the spirit of the invention or the scope of the subjoined claims.

What is claimed is:

1. A hydraulic shape memory material stress to hydraulic pressure transducer, comprising:
   a) a positive displacement hydraulic housing, a surface contained within said hydraulic housing capable of moving between a first and second position within said hydraulic housing, a fluid further contained within said hydraulic housing in contact with said surface, one or more lengths of shape memory material having first and second ends, and means for selectively heating said said shape memory material;
   b) said first end of said shape memory material being connected to a first point within said hydraulic housing, said second position being physically nearer said first point than said first position, said second end of said shape memory material being connected to a second point on said surface, said shape memory material being capable of changing from an unactivated state to an activated state when said shape memory material is heated above a transition temperature so as to move said surface from said first position within said hydraulic housing to said second position within said hydraulic housing, said shape memory material further being capable of changing back from said activated state to said unactivated state when said shape memory material is cooled below said transition temperature thereby allowing said surface to move from said second position to said first position, and said shape memory material having a shorter longitudinal dimension in said activated state than in said unactivated state such that said shape memory material is in at least partial tension in said activated state; and wherein said shape memory material changing from said unactivated state to said activated state causes said surface to move from said first position to said second position, thus transducing stress potential energy from said shape memory material into said fluid as high pressure potential energy.

2. The pressure transducer of claim 1, including at least two of said lengths of shape memory material.

3. The pressure transducer of claim 1, wherein said means for selectively heating said length of shape memory material comprises an electrical apparatus for passing an electric current through said material.

4. The pressure transducer of claim 1, wherein said hydraulic unit comprises a hydraulic cylinder and a hydraulic piston.

5. The pressure transducer of claim 4, wherein said piston is capable of movement between first and second positions within said cylinder, said piston having a fluid contacting surface, said first end of said length of shape memory material connected to said piston and said second end of said length of shape memory material connected to a fixed point relative to said piston, and said fluid being dispersed within said cylinder.

6. The pressure transducer of claim 5, wherein said movement of said piston between said first and second positions within said cylinder acts upon and imparts energy to said fluid thereby allowing said fluid to perform work.

7. The pressure transducer of claim 5, wherein said fixed point is located within a support means attached to said cylinder opposite said piston.

8. The pressure transducer of claim 5, wherein said fixed point is located internal to said first cylinder.

9. The pressure transducer of claim 5, wherein said fixed point is located external to said first cylinder.

10. The pressure transducer of claim 1, further comprising cooling means for said material to shorten the time required for said material to change from said activated state to said unactivated state.

11. The pressure transducer of claim 10, wherein said cooling means comprising cooling fins attached to said cylinder.

12. The pressure transducer of claim 10, wherein said cooling means comprising a thermoelectric heat exchange unit on said circuit.

13. The pressure transducer of claim 10, wherein said cooling means comprising a cooling fluid.

14. The pressure transducer of claim 1, further comprising a means for preventing fluid pressure overload in said cylinder.

15. The pressure transducer of claim 14, wherein said preventing means comprises a fluid accumulator.

16. The pressure transducer of claim 1, wherein said piston is a rigid piston.

17. The pressure transducer of claim 1, wherein said piston is an elastomeric diaphragm.

18. The pressure transducer of claim 1, wherein said piston is a metal bellows.

19. The pressure transducer of claim 1, wherein said piston is an expandable bladder.

20. The pressure transducer of claim 1, wherein said shape memory material is a shape memory alloy.

21. The pressure transducer of claim 20, wherein said shape memory alloy is a nickel-titanium alloy.

22. The pressure transducer of claim 1, wherein said shape memory material is a shape memory polymer.

23. The pressure transducer of claim 1, wherein said shape memory material is a shape memory protein.

24. The pressure transducer of claim 1, wherein said shape memory material has a linear shape.

25. The pressure transducer of claim 1, wherein said shape memory material has a coil shape.

26. The pressure transducer of claim 1, wherein said shape memory material has a braided shape.

27. The pressure transducer of claim 1, wherein said fluid is a liquid.

28. The pressure transducer of claim 1, wherein said fluid is a gas.

29. The pressure transducer of claim 1, wherein said hydraulic unit comprises an expandable bladder.

30. The pressure transducer of claim 1, wherein said hydraulic unit comprises a metal bellows.

31. The pressure transducer of claim 1, wherein said hydraulic unit comprises an elastomeric diaphragm.

32. The pressure transducer of claim 1, used as an actuator.

33. An adjustable shock absorber comprising a conventional shock absorbing device and the shape memory material stress to hydraulic pressure transducer as claimed in claim 1.

34. An adjustable damper comprising a conventional damping mechanism and the shape memory material stress to hydraulic pressure transducer as claimed in claim 1.

35. A hydraulic intensifier comprising the shape memory material stress to hydraulic pressure transducer as claimed in claim 1.

36. A bootstrap comprising the shape memory material stress to hydraulic pressure transducer as claimed in claim 1.

37. A booster comprising the shape memory material stress to hydraulic pressure transducer as claimed in claim 1.

* * * * *